Figure 1:
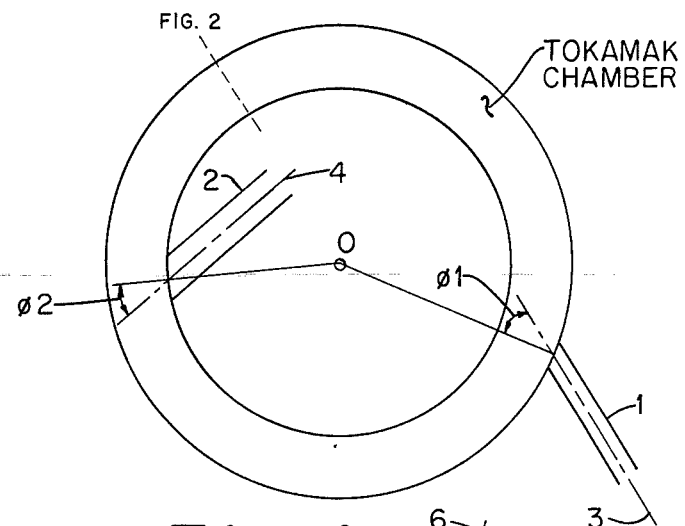

United States Patent [19]

Fisch et al.

[11] 4,425,295
[45] Jan. 10, 1984

[54] SYSTEM AND METHOD FOR GENERATING CURRENT BY SELECTIVE ELECTRON HEATING

[75] Inventors: Nathaniel J. Fisch, Princeton; Allen H. Boozer, Rocky Hill, both of N.J.

[73] Assignee: The United States of America as represented by the United States Department of Energy, Washington, D.C.

[21] Appl. No.: 233,296

[22] Filed: Feb. 9, 1981

[51] Int. Cl.$^3$ ............................................... G21B 1/00
[52] U.S. Cl. ..................................... 376/123; 376/132
[58] Field of Search ........................ 376/123, 124, 132

[56] References Cited

U.S. PATENT DOCUMENTS

| | | | |
|---|---|---|---|
| 3,431,461 | 3/1969 | Dodo et al. | 376/132 |
| 3,911,318 | 10/1975 | Spero et al. | 376/123 |
| 4,263,097 | 4/1981 | Ohkawa | 376/140 |

OTHER PUBLICATIONS

Phys. Rev. A., vol. 11, No. 6 (6/75), pp. 2057-2060, Stenzel et al.
Sov. At. Eng., vol. 25, No. 6 (12/68), pp. 1333-1336.
IPPJ-284 (3/77), Midzuno et al., pp. 1-12, DC Current ... by Travelling Wave.
Czech. J. Phys. b 26 (1976), pp. 638-645, Klima.
Nuclear Fusion, vol. 20, No. 4, 1980, pp. 429-441, Takamura et al.
Phys. Rev. Lett, vol. 45, No. 9 (9/1/80), Fisch et al., "Creating an Asymmetric Plasma Resistivity with Waves," pp. 720-722.
Phys. Rev. A., vol. 24, No. 6 (12/81), pp. 3245-3248, Fisch, "Current Generation in a Relativistic Plasma".
Phys. Fluids, 23 (5), (5/80) pp. 1031-1045, Ott et al., "Theory of Electron Cyclotron Resonance Heating of Tokamaks".
Nuclear Fusion (15), 1975, pp. 487-533, Furth et al., "Tokamak Research".
Proceedings of 2nd Joint Grenoble-Varenna Int. Symp., (9/80), Heating in Toroidal Plasmas, vol. 2, "Methods of Driving Current in Toroidal Plasmas," pp. 1157-1162, Fisch.

Primary Examiner—Sal Cangialosi

[57] ABSTRACT

A system for the generation of toroidal current in a plasma which is prepared in a toroidal magnetic field. The system utilizes the injection of high-frequency waves into the plasma by means of waveguides. The wave frequency and polarization are chosen such that when the waveguides are tilted in a predetermined fashion, the wave energy is absorbed preferentially by electrons traveling in one toroidal direction. The absorption of energy in this manner produces a toroidal electric current even when the injected waves themselves do not have substantial toroidal momentum. This current can be continuously maintained at modest cost in power and may be used to confine the plasma. The system can operate efficiently on fusion grade tokamak plasmas.

16 Claims, 2 Drawing Figures

SYSTEM AND METHOD FOR GENERATING CURRENT BY SELECTIVE ELECTRON HEATING

The Government has rights in this invention pursuant to Contract DE-AC02-76-CH03073 awarded by the Department of Energy.

The present invention relates to systems for achieving nuclear fusion.

A number of writings are listed in this paragraph to serve as background for the explanation hereinafter, the writings listed here being merely representative: "Confining a Tokamak Plasma with rf-Driven Currents" (Fisch), *Physical Review Letters*, Vol. 41, Sept. 25, 1978, p. 873 (called Fisch (1978) herein); "System and Method for Generating Steady State Confining Current for a Toroidal Plasma Fusion Reactor" (Fisch), U.S. patent application, Ser. No. 935,222, filed Aug. 21, 1978 (called Fisch (1978b) herein); "Methods of Driving Current by Heating a Toroidal Plasma" (Fisch), *Proceedings of the Second Joint Varenna-Grenoble International Symposium on Heating in Toroidal Plasma*, Como, Italy, Sept. 3, 1980 (called Fisch (1980) herein); "Creating an Asymmetric Plasma Resistivity with Waves" (Fisch et al.), *Physical Review Letters*, Vol. 45, Sept. 1, 1980, p. 720 (called Fisch et al. (1980) herein); "Current Generation in a Relativistic Plasma" (Fisch), Princeton University Plasma Physics Laboratory Report PPPL-1763, January, 1981 (called "Fisch (1981)" herein); "Tokamak Research" (Furth), *Nuclear Fusion* Vol. 15 (1975) p. 487 (called "Furth (1975)" herein); "Theory of Electron Cyclotron Resonance Heating of Tokamak Plasmas" (Ott et al.), *Physics of Fluids* Vol. 23, May, 1980, p. 1031 (called Ott et al. (1980) herein); "New Methods of Driving Current in Fusion Devices" (Ohkawa), *Nuclear Fusion*, Vol. 10, (1970), p. 185 (called "Ohkawa (1970)" herein); "Steady-State Operation of Tokamaks by r-f Heating" (Ohkawa), *General Atomic Report GA-A*13847, Feb. 23, 1976 (called "Ohkawa (1976)" herein); "The Peristaltic Tokamak" (Wort), *Plasma Physics*, Vol. 13, 1971, p. 258 (called "Wort (1971)" herein). See, also, Coppi et al. U.S. Pat. No. 3,778,343.

The operation of a tokamak is dependent upon the maintenance of a toroidal electric current to confine the plasma. For a fusion reactor based upon the tokamak concept to become an economic reality, this toroidal current must be produced both cheaply and in long pulses. Long pulses are required in order to limit the metal fatigue arising from the heat stress to which the structural components of the tokamak are subjected in a pulsed device. The method originally envisioned for driving this toroidal current is by means of a time-varying magnetic field which induces a toroidal electric field. This method suffers, however, in that it is inherently a pulsed method. In contrast, the invention described herein provides means of generating this current continuously. Moreover, to sustain this current in the manner prescribed by the present invention requires an amount of power that is small enough for the system to be extremely attractive in fusion applications. Accordingly, it is an object of the present invention to provide a system of steady-state toroidal electric currents in the plasma of a fusion device serving to confine the plasma.

The present invention exploits in a novel manner the principle that the rate of coulomb collisions between charged particles is a sensitive function of the relative speed of the colliding particles. Means are provided to selectively heat electrons traveling in one toroidal direction in order to assure that these (heated) electrons collide less with the plasma ions than do the unheated electrons traveling in the opposite direction. Consequently, the ions drag preferentially on the more collisional electrons, with the result that a current is generated with electrons, on average, flowing in the direction of the heated electrons and with ions, on average flowing in the opposite direction.

This mechanism for generating current is especially attractive because it does not rely upon an external source of momentum in the direction that the current flows. For example, consider a plasma immersed in a steady magnetic field. To generate a current in the direction of the magnetic field (herein denoted as the parallel direction), it suffices merely to increase the cyclotron motion of selected electrons in this plasma. This cyclotron heating can be accomplished by launching various radio frequency (rf) waves into the plasma. That the waves need not have substantial parallel momentum allows the advantageous use of waves with parallel phase velocity greater than the speed of light, c. Such waves may be brought to the plasma by means of waveguides and injected into the plasma through conveniently small apertures. Waveguides are a particularly appealing construction for bringing energy into a tokamak; they can easily be interspersed between the toroidal magnets due to their relatively small apertures and they may be bent to suit engineering requirements.

Figure 2:
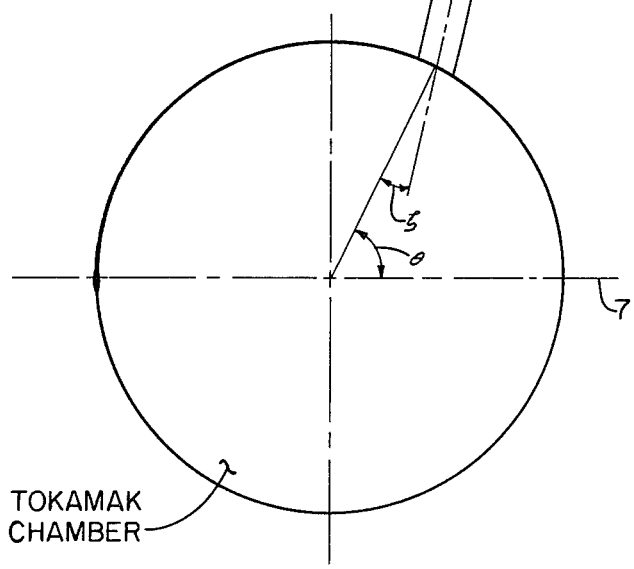

The invention is hereinafter described with reference to the accompanying drawings in which:

FIG. 1 shows the orientation of two waveguide excitation structures with respect to the toroidal plasma chamber, the view being from the top of the device; and FIG. 2 shows the orientation of one waveguide excitation structure with respect to a minor cross-section of the toroidal plasma chamber.

The selective electron heating described above is accomplished by means of injecting very particular waves which are absorbed by electrons which satisfy the resonance condition $\omega - k_{\parallel} v_{\parallel} = n\Omega_e$, where $\omega$ is the wave frequency, $k_{\parallel}$ is the wave parallel wavenumber, $v_{\parallel}$ is the electron parallel velocity, $\Omega_e$ is the electron gyrofrequency and n is an integer. To assure that the electrons resonant with the wave all travel in one parallel direction, a spectrum of waves is chosen that has only one sign of $\omega/k_{\parallel}$, the wave parallel phase velocity. FIG. 1 shows a top view of the tokamak chamber with two such typical wave excitation structures for providing the requisite waves. Before explaining the positioning of these structures, we remark that in a tokamak, $\Omega_e$ is a function of horizontal position, so that as the wave propagates into the tokamak, electrons with different $v_{\parallel}$ become resonant. In order that the wave heat electrons with only one sign of $v_{\parallel}$ at all horizontal positions, the wave is launched so that it is substantially absorbed before it reaches the resonant layer, where $\omega = \Omega_e$. Beyond this layer, which may be visualized in FIG. 1. as the surface of a cylinder whose axis passes through the symmetry point O, the minute residual wave energy could be absorbed by electrons traveling in the wrong direction.

There are two leading wave candidates for this type of electron heating, the ordinary wave and the extraordinary wave. The ordinary wave must be launched from the low-field side of the tokamak where $\omega > \Omega_e$. In FIG. 1, structure 1 is a section of waveguide that is used as a means of exciting the ordinary wave. A horn antenna may optionally be used to couple to this wave in the plasma with electric field E taken substantially in the parallel direction at the waveguide mouth. The extraordinary wave may also be launched by means of a horn antenna, except that the launching must proceed from the high-field side of the tokamak where $\omega > \Omega_e$ and E must be substantially in the vertical direction at the waveguide mouth. In FIG. 1, structure 2 depicts a section of waveguide that is used as a means of exciting the extraordinary wave. The broken lines 3 and 4 in structures 1 and 2 show the waveguide axes and the waves are launched primarily in the direction of the axes. The angles $\phi 1$ and $\phi 2$ are chosen different from zero, representing a tilt of the waveguides in the horizontal plane in order to launch the required spectrum of waves that travel in only one toroidal direction.

As the extraordinary wave propagates into the plasma, the wave energy is absorbed by the resonant electrons which travel in the toroidal direction opposite to the wave parallel phase velocity. Near the edge of the tokamak, where the magnetic field is highest, the resonant electrons have the largest parallel phase velocity. As the wave propagates inward, electrons with slower parallel phase velocities become resonant. When the wave passes the resonant layer, electrons going in the wrong direction become resonant. Propagation studies by Ott et al. (1980) show that for a variety of tokamak conditions nearly all the wave energy is absorbed before the resonant layer is reached. Similar results are shown by Ott also for the ordinary wave, except that this wave is instead absorbed first by fast electrons traveling in the direction of the wave parallel phase velocity.

The process described herein for generating currents is most advantageously employed when additional steps are taken to minimize the power required in launching the waves. For fusion applications, this minimization of the wave power is of utmost importance. As pointed out by Fisch et al. (1980), the current is generated with the least wave power when the speed of the resonant electrons is greatest. The way to accomplish absorption of wave energy by the fastest electrons is to angle the waveguide axis such that the wave propagates vertically through the tokamak rather than horizontally. This can be done for processes employing either the ordinary or extraordinary plasma waves. How this is done is best described with reference to FIG. 2. In this figure, line 7 represents a horizontal cut through the tokamak minor cross-section, which is in the plane of the cross-sectional cut of the tokamak chamber defined in FIG. 1. In FIG. 2 the ray $\theta = 0$ points to the outside of the tokamak whereas the ray $\theta = 180°$ points to the tokamak center, the symmetry point O of FIG. 1. The structure 5 is a section of waveguide with the axis given by the broken line 6. This waveguide section is to be identified either with structure 1 or structure 2 of FIG. 1, depending upon the value of $\theta$, which determines whether injection is from the low-field side ($-90° < \theta < 90°$) or from the high-field side ($90° < \theta < 270°$). Successful vertical angling is accomplished as follows: In employing the ordinary wave it entails picking $\theta$ slightly less than 90° (or slightly greater than 270°) with $\zeta$ about 0°. In employing the extraordinary wave it entails picking $\theta$ slightly greater than 90° (or slightly less than 270°) with $\zeta$ about 0°. Calculations of the wave trajectories and the wave damping are easily carried out with precision for the asymmetric wave spectrum of interest here just as, for example, Ott et al. (1980) calculated the propagation and damping for symmetric spectrums. A typical example of a successful configuration for current generation would be to pick the angles as follows: in employing the extraordinary wave pick $\phi 2 = 45°$, $\theta = 105°$ and $\zeta = 0°$; in employing the ordinary wave pick $\phi 1 = 45°$, $\theta = 85°$ and $\zeta = 0°$.

The above described apparatus may be employed to generate current in any toroidal plasma. The foremost application, however, is likely to be for generating current in tokamak devices. These devices are described by, for example, Furth (1975) and the Coppi et al patent. The art relating to the minor changes in the electronic circuitry necessitated by introducing currents other than ohmically generated currents is described by Fisch (1978b).

The invention described herein may be useful for providing part or all of the necessary current for confinement of the plasma in tokamaks, particularly those tokamaks which are fusion devices, which confine a mixture of fusionable elements at high temperature. The fusion device may be a producer of net power or merely a copious emitter of high energy neutrons or charged particles. In the latter instance, the high energy neutrons may be useful in subsequent nuclear reactions, for example, as in the so-called fusion-fission hybrid reactor. In the former instance, assuming the fusionable material comprises equal densities of deuterium and tritium ions, then sufficient current for continuous confinement of the plasma requires continuous power dissipated in the plasma, $P_d$, such that $$\frac{P_d}{P_f} \simeq \frac{15}{(n_{14} T_{10} a_1 R_1)^{\frac{1}{2}} (3T_{10} - 2) uw}$$

where $P_f$ is the fusion power generated, $n_{14}$ is the electron density normalized to $10^{14} \text{cm}^{-3}$, $T_{10}$ is the temperature normalized to 10 KeV, $a_1$ and $R_1$ are, respectively, the minor and major radii in meters, and u and w are, respectively, the resonant electron speed and parallel velocity normalized to an electron thermal speed. The range of applicability of this formula is for $1 \lesssim T_{10} \lesssim 3$. With suitable angling of the waveguides in the vertical direction and for dense large plasmas such as are envisioned for fusion reactors, it is estimated that uw of 20–30 is easily achievable under extraordinary wave injection and somewhat lower but comparable uw is achievable under ordinary wave injection. Thus, the ratio $P_d/P_f$ may be substantially smaller than unity, implying that the apparatus described herein represents an economically attractive means of supplying steady-state current for confinement in a fusion reactor. The formula for $P_d/P_f$ is a useful aid in designing such a reactor in that the recycled power is directly described as a function of macroscopic plasma parameters.

Whether the extraordinary or ordinary plasma wave is to be preferred as a means of current generation depends upon technological considerations and preferences. For tokamak fusion applications the ordinary wave has the geometrical advantage of injection from the low-field side of the tokamak, which is less cluttered than the inside of the tokamak. On the other hand, the extraordinary wave is damped more quickly, which enables it to transfer its energy to more energetic electrons, so that the current is generated more efficiently. Also the extraordinary wave utilizes sources with somewhat lower frequency. At the present state of the art, sources with the lower frequency are more efficient.

It should be recognized that current generation by selective electron heating in the manner described herein is significantly different from all previously proposed methods of generating currents. This is the only method that both utilizes high frequency sources, wherein $\omega$ is on the order of $\Omega_e$, and is capable of generating current on the magnetic axis in a tokamak. The advantage of utilizing these waves lies primarily in their high power density, their high coupling efficiency, and their ability to exchange energy with arbitrarily fast electrons. A summary and comparison of all the methods proposed for generating currents is provided by Fisch (1980).

Further modifications of the invention herein disclosed will occur to persons skilled in the art and all such modifications are deemed to be within the spirit and scope of the invention as defined by the appended claims.

We claim:

1. A method for generating steady-state toroidal current in a toroidal plasma comprising the steps of:
    preparing a toroidal plasma immersed in a toroidal magnetic field, and
    injecting rf energy into said plasma such that the rf energy comprises a spectrum of waves traveling substantially in a toroidal direction either substantially parallel or substantially anti-parallel to said toroidal magnetic field, said waves having substantially no parallel momentum, where
    said rf energy is phased such as to increase preferentially the cyclotron motion of electrons traveling in one of said toroidal direction said electrons satisfying the resonance condition $\omega - k_{\|} v_{\|} = n\phi_e$, where $\omega$ is the wave frequency, $k_{\|}$ is the wave parallel wavenumber, $v_{\|}$ is the electron parallel velocity, $\omega_e$ is the electron gyrofrequency, n is an integer, and said electrons being selected from the group consisting essentially of electrons substantially on the magnetic axis or having an energy in the range of 10 to 50 times the thermal electron energy.

2. Method according to claim 1 wherein said plasma is prepared in a tokamak device wherein said generated toroidal current is of long duration and of sufficient intensity so that it provides a poloidal magnetic field sufficient for steady-state confinement of said plasma.

3. Method according to claim 2 where said rf energy is carried by the extraordinary plasma waves which are launched into the high-field side of said tokamak by means of waveguides carrying waves with electric field polarized substantially perpendicular to said toroidal magnetic field, wherein said waves have frequency $\omega$ in the range $\Omega_2/2 < \omega < \Omega_e$, where $\Omega_e$ is the cyclotron frequency of resonant electrons in said toroidal magnetic field at some interior location in the plasma.

4. Method according to claim 3 wherein the axes of said waveguides are tilted in the vertical plane as well as in the horizontal plane, so that said rf energy is preferentially absorbed by faster electrons than would be possible without said tilt, where said faster electrons typically have energy in the range of 10 to 50 times the thermal electron energy.

5. Method according to claim 2 wherein said rf energy is carried by the ordinary plasma wave which are launched into the low-field side of the tokamak by means of waveguides carrying waves with electric field polarized substantially parallel to said toroidal magnetic field, wherein said waves have frequency $\omega$ greater than $\Omega_e$.

6. Method according to claim 5 wherein the axes of said waveguides are tilted in the vertical plane as well as in the horizontal plane, so that said rf energy is preferentially absorbed by faster electrons than would be possible without said tilt, where said faster electrons typically have energy in the range of 10 to 50 times the thermal electron energy.

7. Method according to claim 4 wherein said rf energy is carried by the extraordinary plasma wave.

8. Method according to claim 6 wherein said rf energy is carried by the ordinary plasma wave.

9. A system for generating steady-state toroidal current in a toroidal plasma comprising:
    means for preparing a toroidal plasma immersed in a toroidal magnetic field, and
    means for injecting rf energy into said plasma such that the rf energy comprises a spectrum of waves traveling substantially in a toroidal direction either substantially parallel or substantially anti-parallel to said toroidal magnetic field, said waves having substantially no parallel momentum, where
    said rf energy is phased such as to increase preferentially the cyclotron motion of electrons traveling in one of said toroidal direction said electrons satisfying the resonance condition $\omega - k_{\|} v_{\|} = n\Omega_e$, where $\omega$ is the wave frequency, $k_{\|}$ is the wave parallel wavenumber, $v_{\|}$ is the electron parallel velocity, $\Omega_e$ is the electron gyrofrequency, n is an integer, and said electrons being selected from the group consisting essentially of electrons substantially on the magnetic axis or having an energy in the range of 10 to 50 times the thermal electron energy.

10. System according to claim 9 wherein said plasma is prepared in a tokamak device wherein said generated toroidal current is of long duration and of sufficient intensity so that it provides a poloidal magnetic field sufficient for steady-state confinement of said plasma.

11. System according to claim 10 where said rf energy is carried by the extraordinary plasma waves which are launched into the high-field side of said tokamak by means of waveguides carrying waves with electric field polarized substantially perpendicular to said toroidal magnetic field, wherein said waves have frequency $\omega$ in the range $\Omega_e/2 < \omega < \Omega_e$, where $\Omega_e$ is the cyclotron frequency of resonant electrons in said toroidal magnetic field at some interior location in the plasma.

12. System according to claim 11 wherein the axes of said waveguides are tilted in the vertical plane as well as in the horizontal plane, so that said rf energy is preferentially absorbed by faster electrons than would be possible without said tilt, where said faster electrons typically have energy in the range of 10 to 50 times the thermal electron energy.

13. System according to claim 10 wherein said rf energy is carried by the ordinary plasma wave which are launched into the low-field side of the tokamak by means of waveguides carrying waves with electric field polarized substantially parallel to said toroidal magnetic field, wherein said waves have frequency $\omega$ greater than $\Omega_e$.

14. System according to claim 13 wherein the axes of said waveguides are tilted in the vertical plane as well as in the horizontal plane, so that said rf energy is preferentially absorbed by faster electrons than would be possible without said tilt, where said faster electrons typically have energy in the range of 10 to 50 times the thermal electron energy.

15. System according to claim 12 wherein said rf energy is carried by the extraordinary plasma wave.

16. Method according to claim 14 wherein said rf energy is carried by the ordinary plasma wave.

* * * * *